United States Patent [19]  [11] 4,156,025
Dalgleish  [45] May 22, 1979

[54] PURIFICATION OF BEVERAGES

[75] Inventor: James M. Dalgleish, Warwick, England

[73] Assignee: Smedley-HP Foods Limited, Leamington Spa, England

[21] Appl. No.: 822,278

[22] Filed: Aug. 5, 1977

Related U.S. Application Data

[63] Continuation of Ser. No. 698,600, Jun. 22, 1976, abandoned.

[30] Foreign Application Priority Data

Jul. 22, 1975 [GB] United Kingdom ............... 30690/75

[51] Int. Cl.$^2$ ............................................. C12H 1/04
[52] U.S. Cl. ...................................... 426/271; 210/27; 210/30 R; 426/495; 426/592; 426/600
[58] Field of Search ................... 210/24, 27, 30 R, 38; 426/271, 493, 495, 590, 592, 600

[56] References Cited

U.S. PATENT DOCUMENTS

| 2,682,468 | 6/1954 | Frampton | 426/271 |
| 3,878,300 | 4/1975 | Milligan | 426/271 |
| 3,914,442 | 10/1975 | Servadio et al. | 426/271 |
| 3,958,023 | 5/1976 | Butterworth | 426/271 |

OTHER PUBLICATIONS

"Amber-Hi-Lites", Rohm and Haas Company Technical Bulletin, No. 141, Jul. 1974.

*Primary Examiner*—Charles N. Hart
*Assistant Examiner*—Ivars Cintins
*Attorney, Agent, or Firm*—Larson, Taylor and Hinds

[57] ABSTRACT

A method of removing haze precursors from wine vinegar and other beverages by passing it through a bed of an ion-exchange resin material in hydrogen form. The resulting clarified wine vinegar is then matured. The resin material is regenerated in situ by sulphuric acid.

4 Claims, No Drawings

PURIFICATION OF BEVERAGES

This is a continuation of application Ser. No. 698,600, filed June 22, 1976, now abandoned.

This invention relates to the purification of beverages and more particularly to the clarification of beverages, e.g. wine vinegar, malt vinegar and light beer, by the removal of haze-promoting precursors. In this specification the term "wine" means grape wine.

Haze precursors are soluble substances found in alcohol-based beverages which form precipitates with ageing or with chilling and thereby produce a haze or cloudiness which may be objectionable for clear vinegar or larger beer.

In the production of wine vinegar, after acetification it is common practice to mature the raw vinegar for some time in a succession of large wooden vats. To remove haze precursors and thus ensure a clear vinegar the lower portions of the vats are filled with beechwood in slab or chip form. The beechwood has been pretreated by soaking it in a strong vinegar to enable it to carry out better its clarifying function of removal of haze precursors from the vinegar maturing in the vats. The raw vinegar is passed through the beechwood in successive vats to emerge from the last vat having a visual clarity.

During such maturation of the raw vinegar the beechwood loses its efficiency as a clarifier, partly because it becomes coated with impurities from the vinegar and partly because, it is thought, its inherent capability to remove haze precursors from the vinegar is adversely affected. Accordingly, it is necessary to clean and regenerate the beechwood. This may be carried out by removing the beechwood from each vat in turn, washing it with water in a tumble drum and then returning it to the vat. This treatment requires each vat to be taken out of service for about a week. In addition the interior of each vat has to be cleaned whilst it is out of service.

The present invention avoids the traditional requirement for large maturation vats provided with beechwood for purification. It also provides a clarifying agent which is more quickly regenerated than beechwood and furthermore may be regenerated in situ.

According to the invention, a method of removing haze precursors from a beverage, e.g. wine vinegar, malt vinegar or light beer, comprises contacting the beverage with an ion-exchange resin material in hydrogen form to remove at least nearly all haze precursors.

The resin material may be a gelular, strongly acidic, cation exchange resin of the styrene-di-vinyl-benzene type which has been regenerated in hydrogen form by sulphuric acid.

By way of example the invention will now be described with reference to the following examples:

EXAMPLE I

Raw Vinegar made from Wine

After acetification in a known manner the now alcohol-free wine vinegar is passed through a filter to remove any solids and then passed downwards under gravity through a small tower containing a column or bed of discrete ion-exchange resin material in hydrogen form to remove all, or nearly all, the haze precursors from the raw vinegar. Thereafter the vinegar is matured in a series of maturation vessels which do not contain any beechwood or other haze precursors removing agent and therefore can be designed solely for maturation.

The ion-exchange resin material is preferably a gelular, strongly acidic, cation exchange resin of the styrene-di-vinyl-benzene type which has been regenerated in hydrogen form by sulphuric acid. An example of such a material is marketed in bead form under the trade reference AMBERLITE IR-120 by Rohm and Hass (UK) Limited of Croydon, Surrey.

The filtered raw vinegar is passed through the bed of AMBERLITE IR-120 at a rate in excess of 2 gallons of vinegar per cubic foot of resin material per minute and at room temperature. The subsequently matured vinegar is clear and potable and remains so after over ten months.

The resin material in its own clarification tower has a further advantage over the traditional beechwood in the maturation vats, viz. it can be easily and quickly cleaned and regenerated in situ in a matter of hours by backwashing with distilled water and then passing through it 5 lbs of 66° BAUME sulphuric acid per cubic foot or resin material at about 0.5 gallons per cubic foot per minute.

Thus the bed of resin material in the tower is regenerated without interference with the subsequent maturation stage. As a result of transferring from the maturation stage the function of removal of all, or nearly all, the haze precursors, the maturation is speeded up.

Another suitable resin material for the bed is ZEROLIT 225 which is referred to in Example II.

EXAMPLE II

Raw Vinegar made from Malted Barley

Preparation of Bed

A tower is filled with a column of an ion-exchange resin material in bead form which is a gelular strongly acidic cation exchange resin of the styrene-di-vinyl-benzene type. An example of such a material is that marketed under trade reference ZEROLIT 225 by Zerolit Limited of Isleworth, Middlesex. Sulphuric acid (4% W/V) is added to the column and thoroughly mixed with it, the resin beads being arranged to settle and form an air-free bed. One and a half bed volumes of further sulphuric acid (4% W/V) are run through the bed and then the latter is left overnight in sulphuric acid (4% W/V). The bed is then washed with distilled water until the effluent shows a pH of 4–5. The resin bed is now in the required hydrogen form.

Treatment

The raw malt vinegar is filtered to remove suspended particles present until it has a haze of less than 30 Helm Units as measured by a radiometer haze meter. The filter may be a Type 952 METAFILTER as marketed by Stella-Meta Filters Limited of Whitchurch, Hampshire. The filtered vinegar is then passed through the column or bed of ZEROLIT 225 at a rate of about six bed volumes per hour. The initial vinegar percolate leaving the bed is discarded because of dilution with the distilled water which remained in the bed. When however the vinegar percolate reaches the correct acidity, it is collected and then pasteurized at 80° C. Maturing is not then required.

Regeneration of Bed

After treatment has finished, the resin bed is thoroughly washed with distilled water. One and a half bed volumes of sulphuric acid (4% W/V) are then passed through the resin bed and the latter is left overnight with this acid. After subsequent removal of the acid the resin bed is re-washed with distilled water until the effluent therefrom reaches a pH of 4–5. Thus regenerated, the bed is again in the required hydrogen form and ready to receive the next batch of filtered malt vinegar.

Results

Samples of the treated malt vinegar, both aerobic and anaerobic, together with untreated control samples were stored in bottles either in a warm room to speed up the process or in stores at ambient temperature and then regularly checked for haze using a radiometer haze meter calibrated in Helm Units.

After a few weeks the control samples started to form a flocculant precipitate which aggregated and dropped to the bottom of the bottles thus giving false readings. The bottles therefore had to be shaken to bring all the precipitation into suspension to obtain a true haze reading. The results appear in the TABLE below, the figures in parenthesis representing the above-mentioned false readings. T refers to the treated samples whilst C refers to the control samples.

| | WARM ROOM | | | | AMBIENT STORES | | | |
|---|---|---|---|---|---|---|---|---|
| | AEROBIC | | ANAEROBIC | | AEROBIC | | ANAEROBIC | |
| WEEK NO. | T | C | T | C | T | C | T | C |
| 0 | 26 | 26 | 26 | 26 | 26 | 26 | 26 | 26 |
| 4 | 36 | 146 | 36 | 102 | 26 | 97 | 29 | 94 |
| 9 | 57 | (89) 257 | 50 | (72) 221 | 52 | 180 | 48 | 171 |
| 12 | 78 | (85) 444 | 72 | (46) 321 | 78 | (84) 350 | 71 | (73) 241 |
| 17 | 97 | (75)>500 | 76 | (40) 335 | 87 | (83) 418 | 72 | (58) 255 |
| 20 | 113 | (89)>500 | 88 | (70) 420 | 115 | (89) 496 | 81 | (53) 295 |
| 27 | 122 | (59)>500 | 87 | (33) 410 | 110 | (63)>500 | 84 | (37) 285 |
| 45 | 280 | (106)>500 | 104 | (31)>500 | 160 | (79)>500 | 95 | (35) 349 |

The TABLE shows that the haze formation of the samples treated according to the invention is considerably less than that of the control samples. After 45 weeks the anaerobic treated samples in the ambient stores which correspond to the bottled vinegar in the shops had no appreciable haze, i.e. they were acceptably bright.

EXAMPLE III

Finished Vinegar made from Malted Barley

The treatment for finished malt vinegar is the same as that described for raw malt vinegar in Example II except that the initial filtering stage is not necessary and may be omitted.

EXAMPLE IV

Raw Light Beer

The raw or unmatured beer is filtered to remove suspended particles and then passed down through a column or bed of AMBERLITE IR-120 resin material to remove all, or nearly all haze precursors. The resulting percolate when at the correct acidity is collected and then matured or finished.

What we claim is:

1. A method of removing haze precursors from a fermented beverage selected from the group consisting of raw vinegar from grape wine, raw vinegar from malted barley and raw light beer and then maturing it comprising the steps of filtering the fermented beverage to remove solids, said fermented beverage immediately before filtration being in a raw state, passing the filtered beverage through a clarification tower containing an ion-exchange resin material in hydrogen form comprising a gellular strongly acidic cation exchange resin of a sulphonated styrene-divinyl benzene copolymer having 8% divinylbenzene by weight, and transferring the clarified beverage without further resin treatment to a vessel used solely for maturation and maturing the clarified beverage therein.

2. A method according to claim 1, wherein the beverage is passed downwards under gravity through a bed of the resin material which is in bead form.

3. A method according to claim 1, wherein the resin material is in the form of a bed through which the beverage is passed downwards and is regenerated in situ by passing firstly water and then sulphuric acid through it.

4. A method according to claim 1, wherein the resin material has been regenerated in hydrogen form by sulphuric acid.

* * * * *